US012385609B1

(12) United States Patent
Qiu

(10) Patent No.: US 12,385,609 B1
(45) Date of Patent: Aug. 12, 2025

(54) SPHERICAL LAMP WITH CHARGING BASE HAVING THREADED HEAD

(71) Applicant: Yuanzhen Qiu, Yiyang (CN)

(72) Inventor: Yuanzhen Qiu, Yiyang (CN)

( * ) Notice: Subject to any disclaimer, the term of this patent is extended or adjusted under 35 U.S.C. 154(b) by 0 days.

(21) Appl. No.: 18/822,358

(22) Filed: Sep. 2, 2024

(30) Foreign Application Priority Data

Jul. 12, 2024 (CN) ........................ 202421653220.X

(51) Int. Cl.

| | |
|---|---|
| ***F21K 9/238*** | (2016.01) |
| ***F21L 4/08*** | (2006.01) |
| ***F21V 19/00*** | (2006.01) |
| ***F21V 21/40*** | (2006.01) |
| ***F21V 23/00*** | (2015.01) |
| ***F21V 23/04*** | (2006.01) |
| ***F21V 23/06*** | (2006.01) |
| *F21Y 115/10* | (2016.01) |

(52) U.S. Cl.

CPC .............. *F21L 4/085* (2013.01); *F21K 9/238* (2016.08); *F21V 19/0005* (2013.01); *F21V 21/406* (2013.01); *F21V 23/005* (2013.01); *F21V 23/0428* (2013.01); *F21V 23/06* (2013.01); *F21Y 2115/10* (2016.08)

(58) Field of Classification Search

CPC . F21S 9/02; F21S 9/022; F21V 21/406; F21L 4/085; F21K 9/20; F21K 9/235

See application file for complete search history.

(56) References Cited

U.S. PATENT DOCUMENTS

| | | | | | |
|---|---|---|---|---|---|
| 2,518,039 | A * | 8/1950 | Goldman | F21L 4/085 | 320/DIG. 15 |
| 3,109,132 | A * | 10/1963 | Waldemar | F21L 4/085 | 362/183 |
| 3,521,050 | A * | 7/1970 | Shagena, Jr. | F21L 4/085 | 362/183 |
| 3,829,676 | A * | 8/1974 | Nelson | F21L 4/085 | 362/183 |
| 3,835,309 | A * | 9/1974 | Witte | F21L 4/085 | 362/183 |
| 4,029,954 | A * | 6/1977 | Moyer | F21V 21/002 | 362/183 |
| 4,092,580 | A * | 5/1978 | Prinsze | B60Q 3/88 | 320/DIG. 22 |
| 4,327,401 | A * | 4/1982 | Siiberg | H02J 7/0042 | 362/183 |
| 4,605,993 | A * | 8/1986 | Zelina, Jr. | F21S 9/02 | 362/183 |
| 4,764,853 | A * | 8/1988 | Thomas | F21S 9/022 | 362/183 |

(Continued)

*Primary Examiner* — Ismael Negron

(74) *Attorney, Agent, or Firm* — Birchwood IP

(57) ABSTRACT

A spherical lamp includes a lamp head with an AC power to low-voltage DC power conversion board; and a detachable body having an LED light source, a battery, and a conductive plate. When the body is detached from the lamp head, the battery powers the LED light source. The power conversion board has a plurality of elastic conductive pins, aligning with corresponding concentric conductive copper foils on the conductive plate, enabling electrical connection when the lamp head and body are joined, so that the battery is charged with low-voltage DC power received by the conductive plate from the conversion board.

13 Claims, 13 Drawing Sheets

(56) References Cited

U.S. PATENT DOCUMENTS

| | | | | |
|---|---|---|---|---|
| 4,825,345 A * | 4/1989 | Stevens | F21L 4/085 | 362/183 |
| 7,391,182 B2 * | 6/2008 | Barbeau | F21L 2/00 | 320/107 |
| 7,934,849 B2 * | 5/2011 | Ellis | F21S 9/02 | 362/183 |

* cited by examiner

SPHERICAL LAMP WITH CHARGING BASE HAVING THREADED HEAD

CROSS-REFERENCE TO RELATED APPLICATIONS

This application claims priority to Chinese Patent Application No. 202421653220X, filed on Jul. 12, 2024, which is hereby incorporated by reference in its entirety.

TECHNICAL FIELD

This utility model relates to lighting devices, particularly to a spherical lamp with charging base having threaded head.

BACKGROUND

Existing LED or energy-saving spherical lamps generally have an integrated structure directly connected to indoor power supplies. However, in the event of a power outage, the lamp cannot provide illumination, causing inconvenience to users in emergency situations.

To get to grips with this, various emergency lamp solutions with built-in storage battery functions have emerged, capable of connecting to both solar and indoor power sources. These devices incorporate built-in storage batteries that continue to power the LED light source in case of a solar or indoor power outage, thus ensuring emergency indoor lighting.

The advantage of this technology is that the built-in battery provides continuous power and illumination during power outages, facilitating indoor use. However, the drawback is that these LED lighting devices are fixed in place and cannot provide portable illumination.

Therefore, a need exists for a more easily detachable solution that can continuously provide lighting during power outages, addressing this problem.

SUMMARY

The objective of the present disclosure is to overcome the above-mentioned drawbacks by providing a separable wireless charging spherical lamp. This lamp employs a detachable connection between the lamp head and the lamp body, enabling both charging and the convenient use of the lamp body for portable lighting.

This utility model achieves its objective through the following means.

A separable wireless charging spherical lamp includes a lamp head and a lamp body. The lamp body is positioned below the lamp head and is used for illumination. The lamp body and lamp head are detach-ably connected. Inside the lamp head, there is a power conversion board that imports mains electricity and converts it to low voltage electricity. Inside the lamp body, there is a conductive plate that imports the low voltage electricity from the power conversion board into the lamp head, charging the battery inside the lamp body while also supplying power to the LED light source within the lamp body. The battery provides continuous power to the LED light source when the lamp head and lamp body are completely separated. The bottom of the power conversion board is equipped with no fewer than two elastic conductive pins, which correspond to no fewer than two concentric annular conductive copper foils on the conductive plate. The spacing between the conductive copper foils corresponds to the spacing between the elastic conductive pins. When the lamp body and lamp head are connected, the elastic conductive pins electrically connect with the conductive copper foils. This design allows for the separable configuration of the lamp head and lamp body, and the inclusion of a rechargeable battery within the lamp head. This setup enables the use of mains electricity to charge the battery when connected, and in the event of a power outage, the built-in battery provides continuous illumination. Additionally, the lamp body can be easily removed and used as an emergency lighting device for indoor mobility. The use of equidistant annular conductive copper foils ensures electrical connection at any angle around the circumference, facilitating user reassembly without directional recognition, thereby improving installation safety and convenience.

In the above description, as a preferred solution, the conductive plate is positioned at the top of the lamp body, and the top of the lamp body is provided with conductive through-holes. The conductive copper foils are exposed through these conductive through-holes, facilitating contact between the elastic conductive pins and the conductive copper foils.

One technical solution is as follows: The number of elastic conductive pins is two, arranged side by side, with one connected to the positive power supply and the other to the negative power supply. The center of the conductive copper foils is a dot, which contacts the positive elastic conductive pin, and is surrounded by a concentric annular copper foil that contacts the negative elastic conductive pin.

Another technical solution is as follows: The number of elastic conductive pins is three, arranged side by side, with the middle pin connected to the positive power supply and the two outer pins connected to the negative power supply. The center of the conductive copper foils is a dot, which contacts the positive elastic conductive pin, and is surrounded by a concentric annular copper foil that contacts the negative elastic conductive pins.

Another technical solution is as follows: The number of elastic conductive pins is two, arranged side by side, with one connected to the positive power supply and the other to the negative power supply. The conductive copper foils consist of two concentric annular copper foils, with the inner ring contacting the positive elastic conductive pin and the outer annular copper foil contacting the negative elastic conductive pin.

Another technical solution is as follows: The number of elastic conductive pins is three, arranged side by side, with the middle pin connected to the positive power supply and the two outer pins connected to the negative power supply. The conductive copper foils consist of two concentric annular copper foils, with the inner ring contacting the positive elastic conductive pin and the outer annular copper foil contacting the negative elastic conductive pins.

In the above description, as a preferred solution, the lamp head consists of a conductive threaded head and an upper shell, which are snap-fitted together. The upper shell is trumpet-shaped, with an open lower end forming an accommodating cavity. The power conversion board is located inside the accommodating cavity, and the open end of the upper shell is equipped with a bottom shell that encloses the power conversion board. The center of the bottom of the power conversion board is equipped with no fewer than two elastic conductive pins, corresponding to no fewer than two guide holes in the center of the bottom shell. The conductive pins pass through the guide holes, with their heads exposed on the outer surface of the bottom shell. Corresponding to the position of the elastic conductive pins, there are no fewer than two guide holes in the center of the bottom shell. The conductive pins pass through the guide holes, with their heads exposed on the outer surface of the bottom shell.

In the above description, as a preferred solution, the upper surface of the bottom shell is provided with a recessed annular groove, inside which is an annular iron sheet.

The lamp body includes a spherical lamp shell and an installation shell, which are fixedly connected. The installation shell is a recessed cavity with an open lower end and an upper end with an installation surface. The conductive plate is fixedly installed at the center of the installation surface, which also has a conductive through-hole at its center. The outer side of the installation surface has a recessed annular groove containing an annular magnet. Inside the installation shell are also a support column and a lamp board. The support column is connected to the installation shell, and the lamp board is fixed to the support column with screws. The lower surface of the lamp board is equipped with an LED light source, and the lamp board is connected to the rechargeable battery and conductive plate via wires.

In the above description, as a preferred solution, the upper surface of the lamp board is provided with a control circuit to control the LED light source and charge the battery.

In the above description, as a preferred solution, a handle is positioned at the top edge of the installation shell. The handle is rotatably connected to the installation shell, and a groove is provided at the edge of the installation shell to accommodate the handle. Additionally, a button switch is located at the edge of the installation shell to manually control the on/off state of the LED light source.

The beneficial effects produced by the present disclosure are as follows: It adopts the method of using mains electricity to continuously supply power to the rechargeable battery inside the spherical lamp, ensuring reliability and stability. Meanwhile, it employs a simple detachable design for the lamp body, solving the technical defects of the existing designs. This makes disassembly convenient and facilitates mobile lighting. The use of equidistant annular conductive copper foils allows for conductive connection at any angle in the circumferential direction, making it easy for users to disassemble and reassemble without the need for directional identification, thereby improving safety and convenience during installation.

Numeral reference: 1—lamp head; 101—threaded head; 102—upper shell; 1021—snap-fitted block; 1022—limit strip; 103—power conversion board; 104—bottom shell; 1041—annular groove; 105—conductive pins; 1051—negative conductive pin; 1052—positive conductive pin; 106—guide holes; 2—lamp body; 201—spherical lamp shell; 202—groove; 203—installation shell; 2031—charging socket; 2032—button switch; 2033—installation surface; 2034—conductive through-holes; 204—support column; 205—handle; 206—lamp board; 207—conductive plate; 2071—negative contact copper foil; 2072—positive contact copper foil; 208—LED light source; 3—rechargeable battery; 4—magnet; 5—iron sheet.

DESCRIPTION OF EMBODIMENTS

Below is a detailed description of the utility model, combined with the accompanying drawings and specific embodiments.

Figure 1:
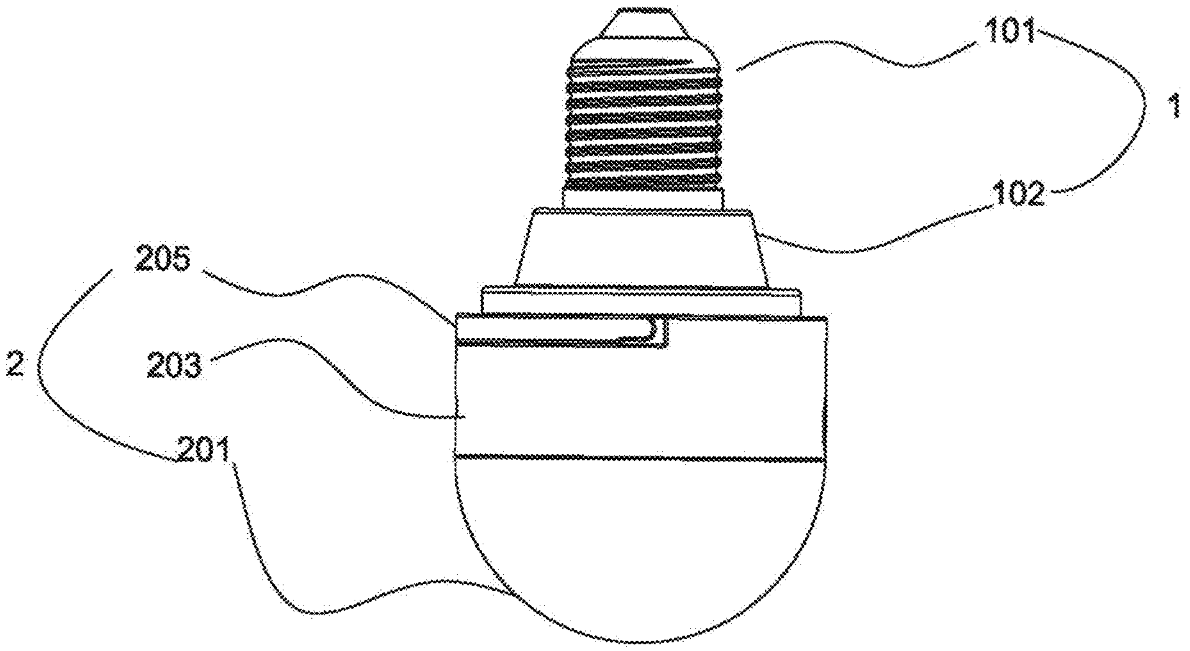
FIG. 1 is a front view schematic diagram of the embodiment.
Figure 2:
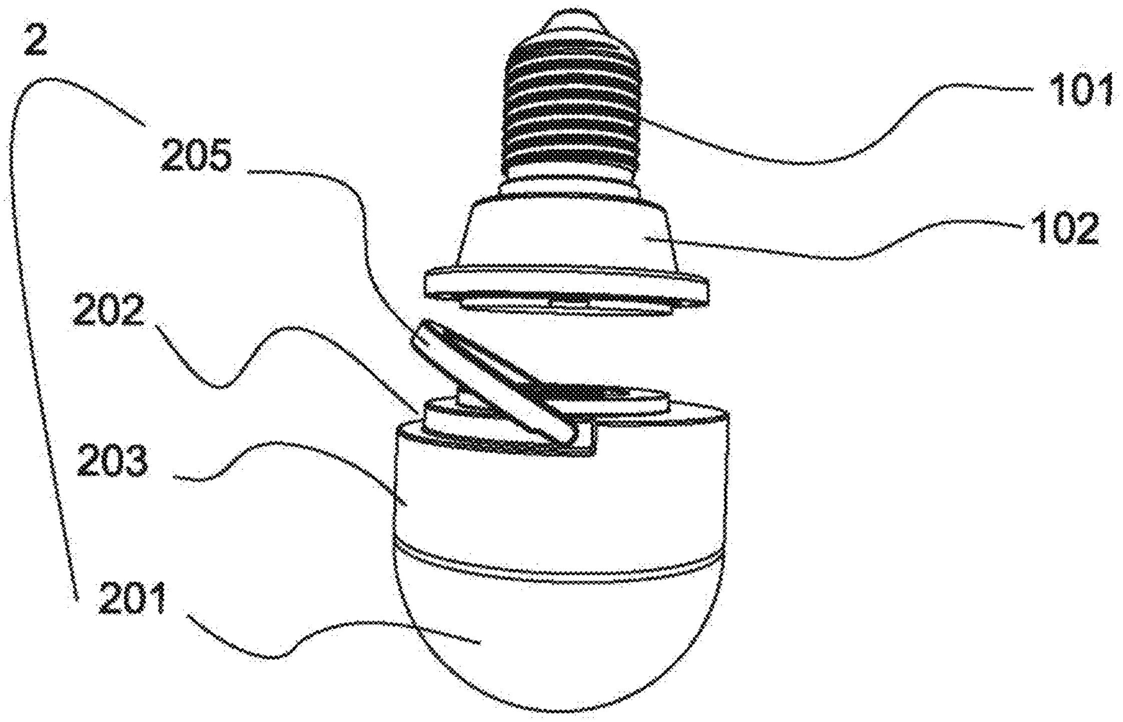
FIG. 2 is an exploded perspective schematic diagram of the lamp head and lamp body of the embodiment.

The purpose of the present disclosure is achieved through the following methods:

Embodiment 1: A separable wireless charging spherical lamp. Refer to FIGS. 1 and 2. This product is mainly composed of two major parts: the upper part is the lamp head 1, and the lower part is the lamp body 2. The lamp head 1 adopts national standard interfaces such as E17, E26, B27, or other threaded or socket specifications for direct connection to indoor lamp sockets, supplying power to the entire lamp. The lamp body 2 is the illumination part consisting of the LED light source 208. The lamp head 1 and lamp body 2 are combined using a magnetic structure at their contact surfaces. When the lamp body 2 is pulled downward by hand, it separates from the lamp head 1. The lamp head 1 remains connected to the lamp socket, while the lamp body 2 can be used separately for illumination. The optimal connection method between the lamp head 1 and lamp body 2 is magnetic, but they can also be connected using snap-fitted or tight-fit methods.

Figure 3:
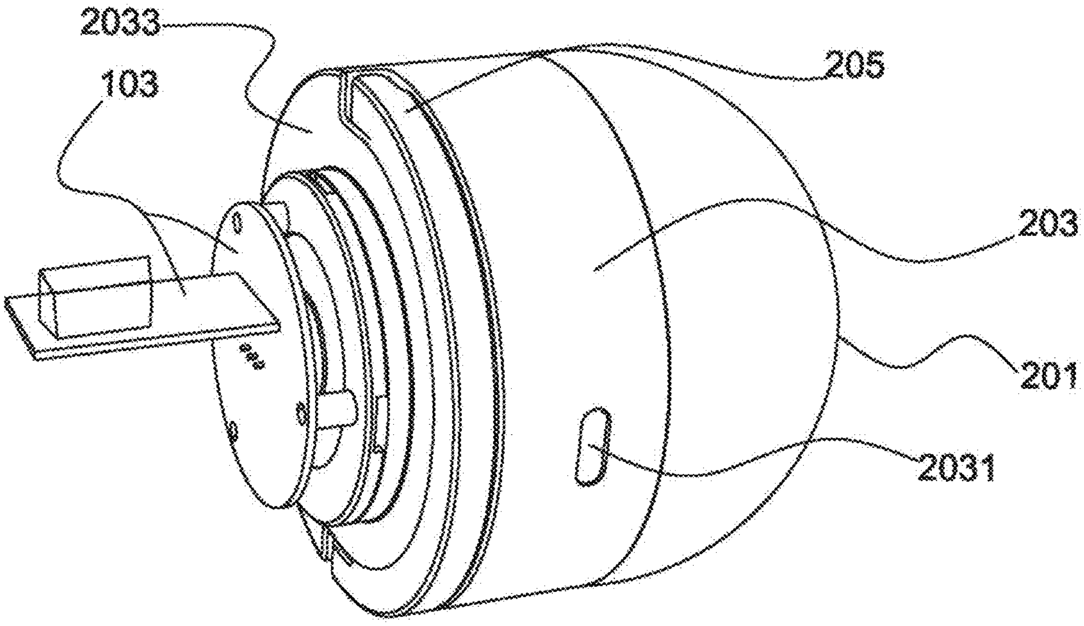
FIG. 3 is a perspective schematic diagram of the power conversion board and lamp head of embodiment 1.
Figure 4:
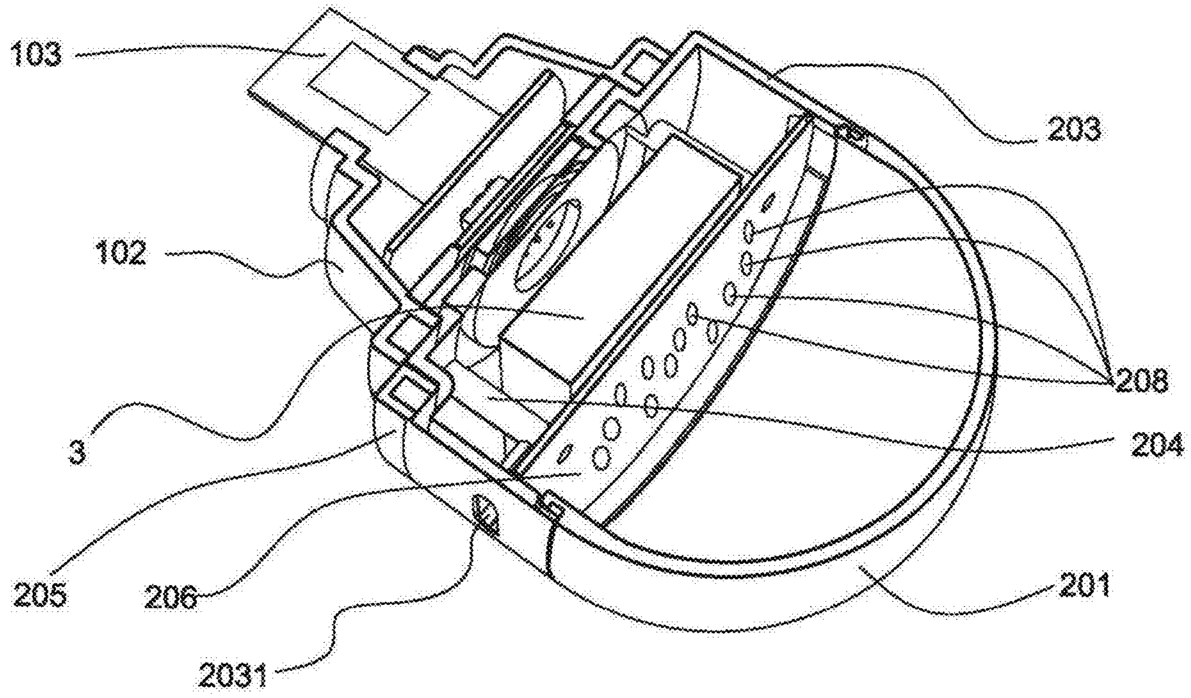
FIG. 4 is a sectional perspective schematic diagram of the lamp body of embodiment 1.

Refer to FIGS. 3 and 4. The lamp head 1 is composed of a conductive threaded head 101 and an upper shell 102. The upper shell 102 is trumpet-shaped, with a small opening at the top snap-fitted to the conductive threaded head 101 and an open bottom forming an accommodating cavity. A bottom shell 104 is provided at the bottom opening to seal it. On the side of the bottom shell 104 facing the accommodating cavity, there are three support columns 204. The power conversion board 103 is fixedly installed on the support columns 204 and screwed to the inner side of the bottom shell 104. The power conversion board 103 connects to the mains electricity and converts the high voltage (220V/110V) power to low voltage (5V or 12V) to supply power to the LED light source 208. The technology for converting high voltage to low voltage is a mature existing technology, widely used in LED and energy-saving lamps, and its working principle is not further explained here.

Figure 5:
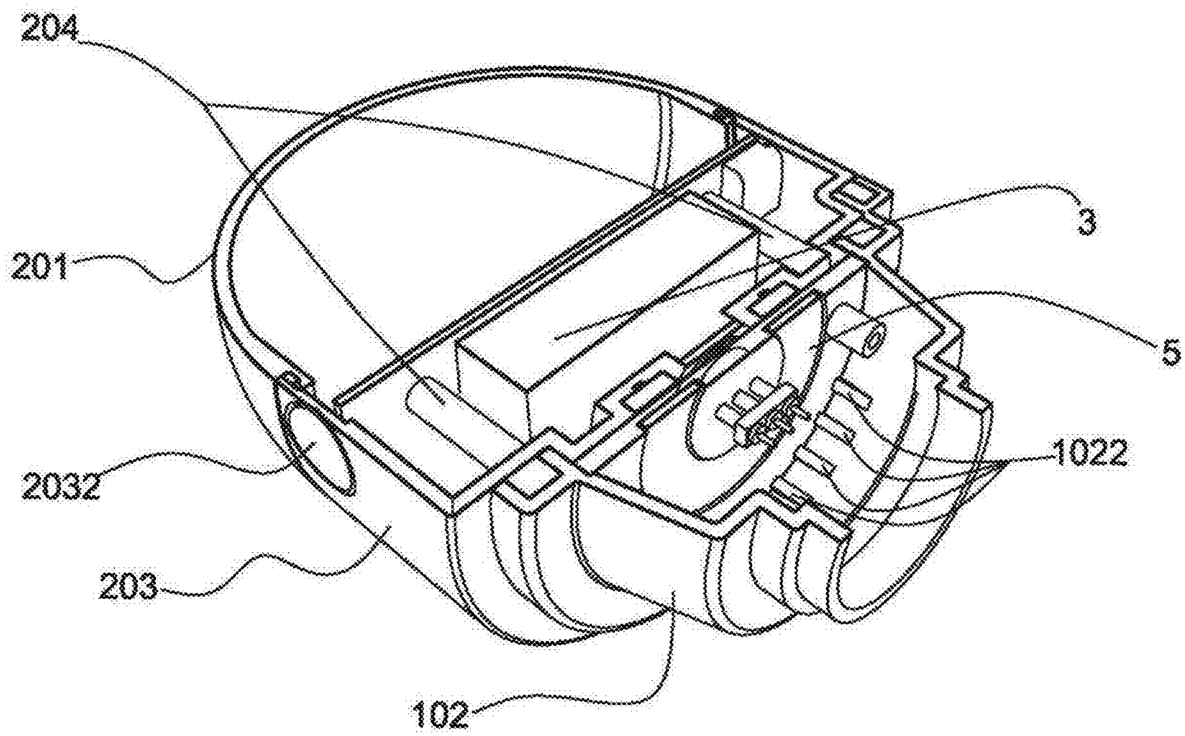
FIG. 5 is a sectional top view schematic diagram of the lamp body of embodiment 1.
Figure 6:
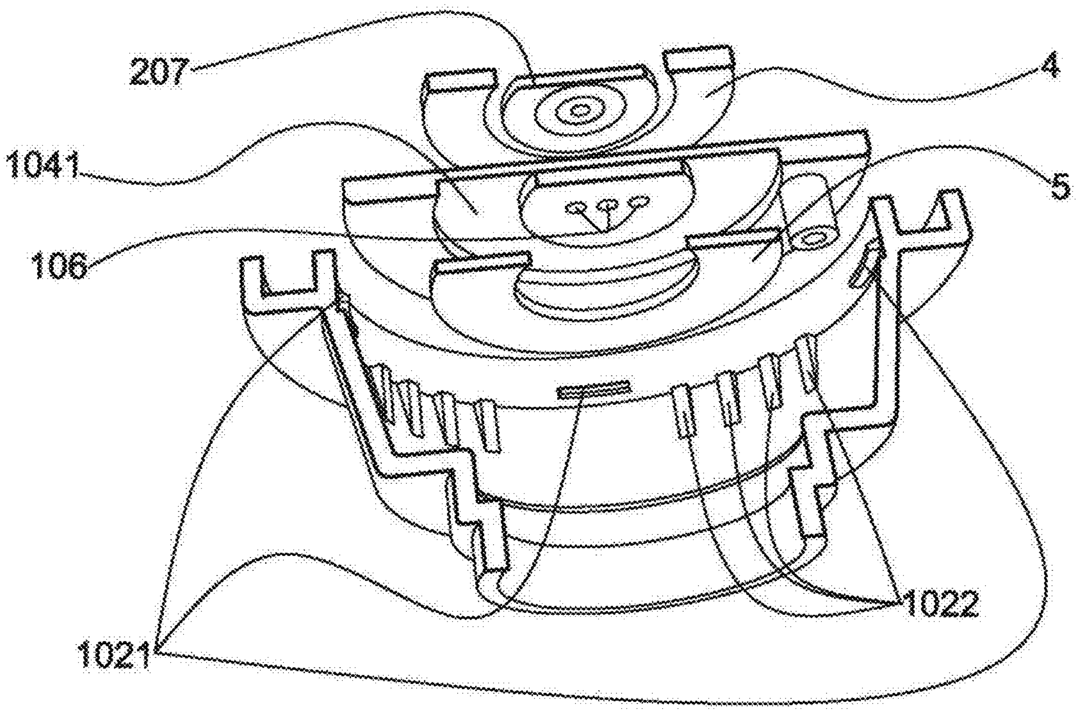
FIG. 6 is an exploded sectional perspective schematic diagram of the upper shell of embodiment 1.
Figure 7:
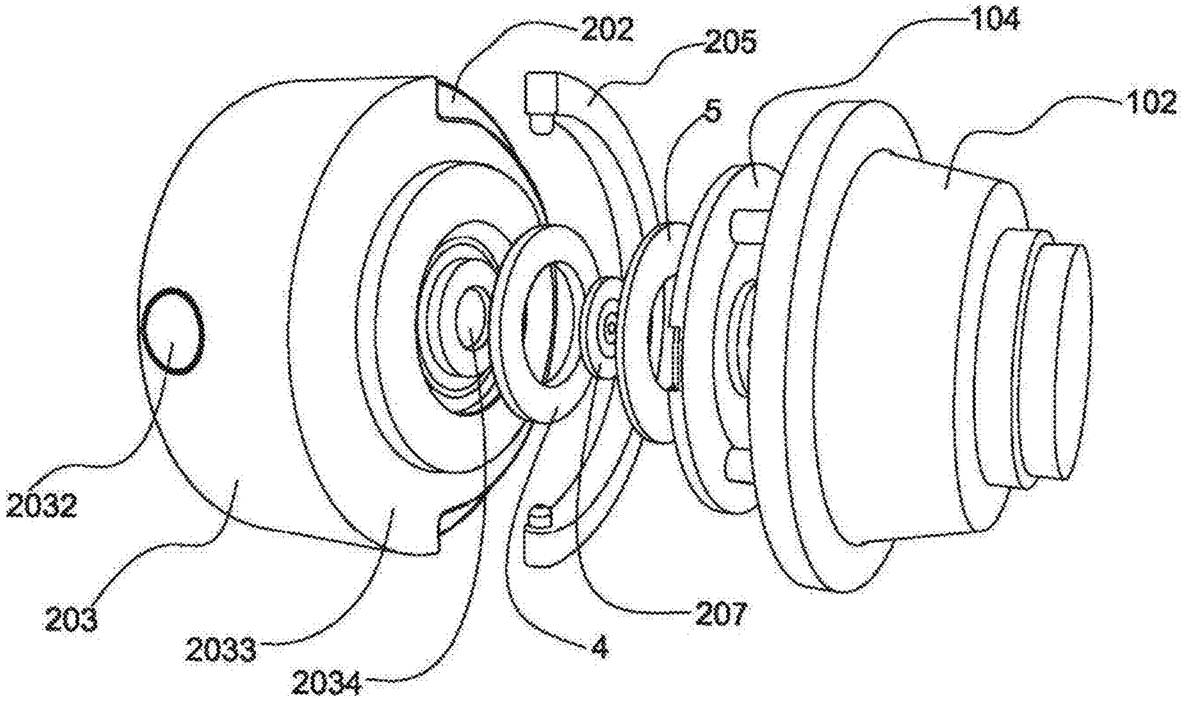
FIG. 7 is an exploded structural schematic diagram of the housing and upper shell of embodiment 1.

Refer to FIGS. 5, 6, and 7. The bottom shell 104 is a circular plate structure. At the edge of the opening at the lower end of the upper shell 102, there are four snap-fitted blocks 1021, corresponding to four slots on the bottom shell 104. By applying pressure to the bottom shell 104, it can be snap-fitted with the upper shell 102. To fix the position of the bottom shell 104, a limit strip 1022 is provided at the upper end of the snap-fitted block 1021. The bottom end of the limit strip 1022 has a flat structure to abut the upper surface of the bottom shell 104. The distance between the limit strip 1022 and the snap-fitted block 1021 equals the thickness of the bottom shell 104. After snap-fitting, the bottom shell 104 is securely connected with the upper shell 102.

On the inner side of the bottom shell 104, concentric with the center of the bottom shell 104, there is an annular groove 1041. Inside the annular groove 1041 is an annular iron sheet 5 (which can also be other materials that can be attracted by a magnet, such as a magnet, cobalt alloy, nickel alloy, etc.). The advantage of using an annular structure is that no directional identification is needed; once the lower part of the lamp head 1 and the upper part of the lamp body 2 are close, they can form an attractive effect without confirming the direction (if using point-shaped magnet attraction, point-to-point attraction is needed). Correspondingly, an annular magnet 4 is provided at the upper end of the lamp body 2, with the magnet 4 having the same size and shape as the iron sheet 5, achieving the best attraction effect.

Figure 8:
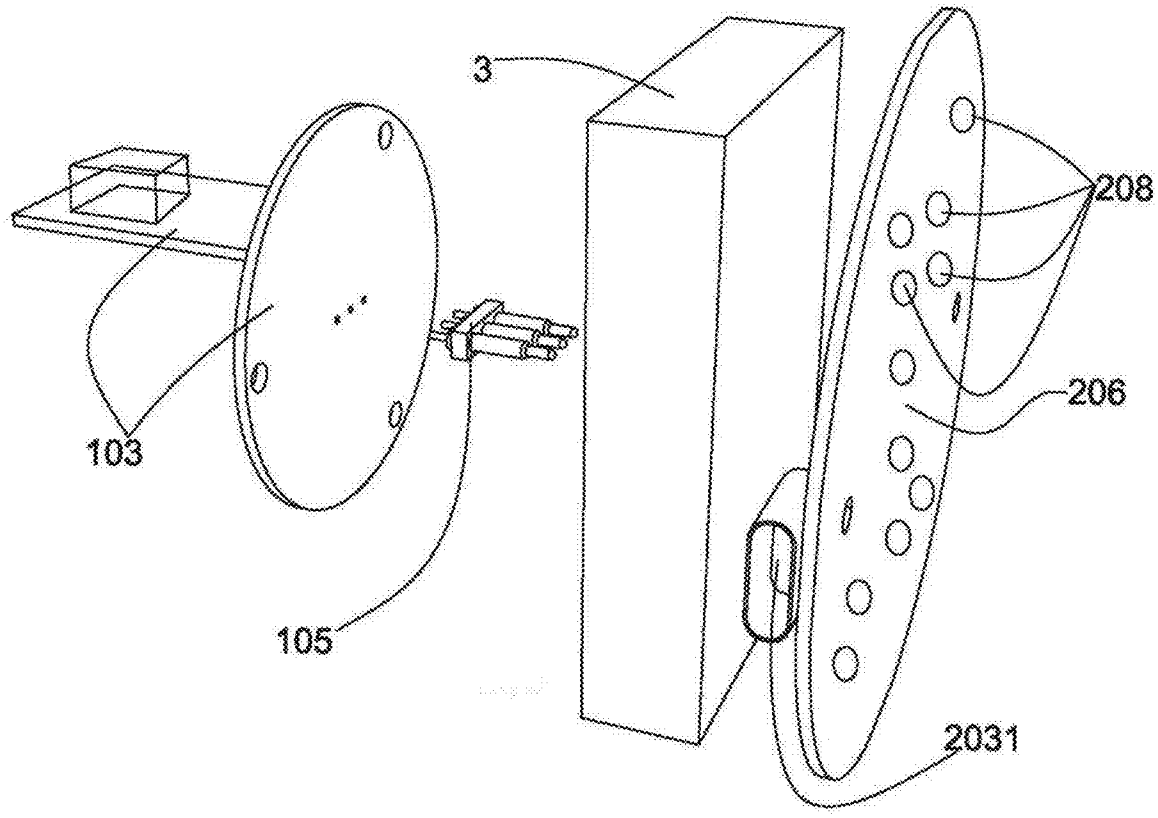
FIG. 8 is a schematic diagram of the electronic part structure of embodiment 1.
Figure 9:
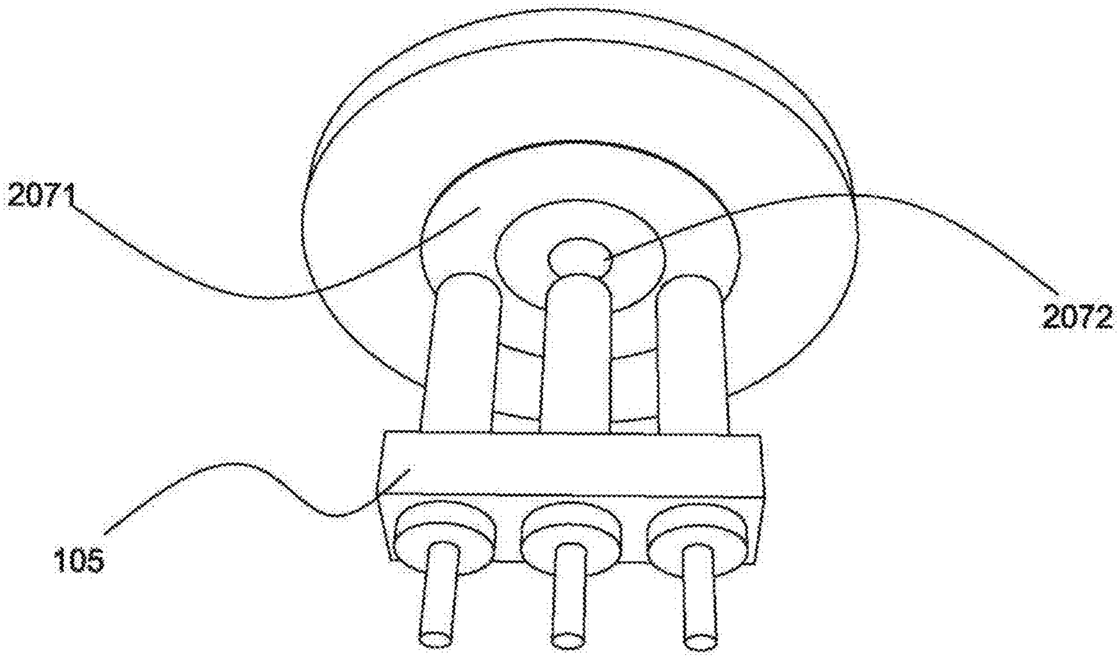
FIG. 9 is a schematic diagram showing the connection between the conductive pins and the connection plate of embodiment 1.

Refer to FIGS. 8 and 9. In the central part of the bottom shell 104, there are three guide holes 106 arranged side by side along the diameter direction. The central guide hole 106 is at the center of the bottom shell 104, with the other two guide holes 106 symmetrically arranged. Correspondingly, three elastic conductive pins 105 are provided at the corresponding positions on the power conversion board 103. The fixed ends of the elastic conductive pins 105 are welded to the power conversion board 103 and electrically connected to the low voltage output. The retractable ends of the elastic conductive pins 105 pass through the guide holes 106, with their heads exposed at the lower end of the bottom shell 104. The conductive pin 105 at the center of the bottom shell 104 outputs positive power, while the left and right conductive pins output negative power.

Refer to FIGS. 3, 4, and 5. The lamp body 2 includes a spherical lamp shell 201 and an installation shell 203. Both are circular and fixedly connected. The installation shell 203 is annular with an open lower end and an installation surface 2033 at the upper end. The spherical lamp shell 201 is attached to the lower opening. The spherical lamp shell 201 is made of transparent PS or PC plastic material for light transmission and is connected to the installation shell 203 via a snap-fitted mechanism. Inside the installation shell 203, directly above the spherical lamp shell 201, there is a circular lamp board 206, which is fixedly integrated with the installation shell 203 through a support column 204. The support column 204 is connected to the installation shell 203, and the lamp board 206 is screwed onto the support column 204. The lower surface of the lamp board 206 is equipped with the LED light source 208, directly facing the transparent spherical lamp shell 201. The upper surface of the lamp board 206 contains a control circuit chip for controlling the LED light source 208 and charging the rechargeable battery 3. The lamp board 206 is connected to the conductive plate 207 via wires to introduce the low-voltage power converted from mains electricity into the lamp board 206.

Figure 10:
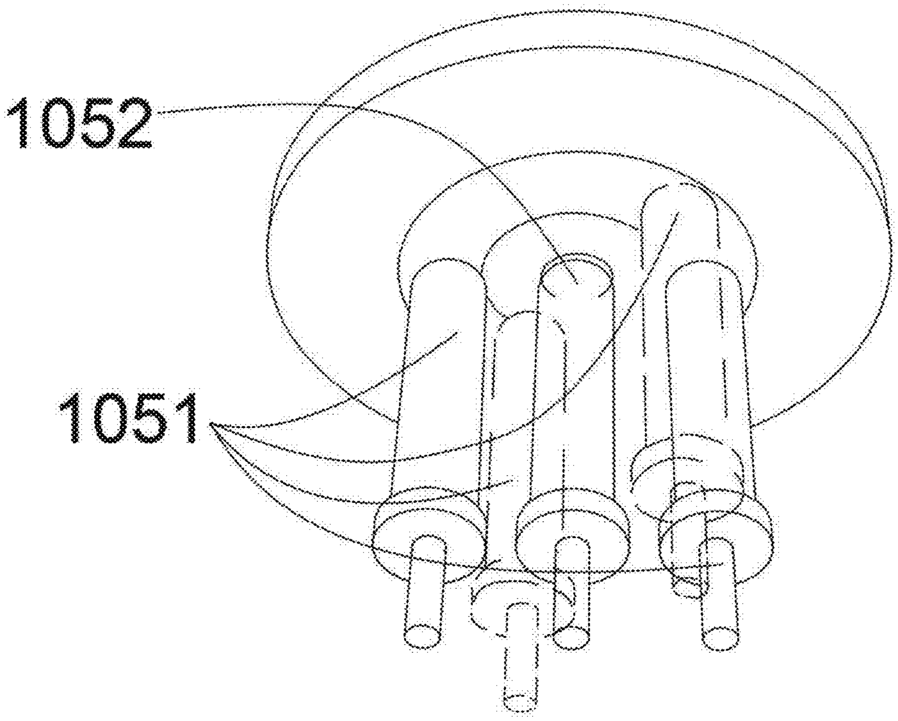
FIG. 10 is a schematic diagram showing the conductive pins contacting the connection plate at any rotational angle of embodiment 1.

Refer to FIGS. 6, 7, and 9. The installation surface 2033 of the installation shell 203 features a recessed annular groove 1041, containing an annular magnet 4. The conductive plate 207 and the annular magnet 4 share the same center. The annular magnet 4 corresponds to the annular iron sheet 5. At the center of the installation surface 2033, there is a conductive through-hole 2034, allowing the lower ends of the conductive pins 105 to pass through. The conductive plate 207 is positioned directly below the conductive through-hole 2034, making contact with the conductive pins 105. The center of the conductive plate 207 is a dot-shaped positive contact copper foil 2072, electrically connected to the positive conductive pin 1052. The periphery of the positive contact copper foil 2072 is an annular negative contact copper foil 2071, electrically connected to the two negative conductive pins 1051. The advantage of this design of the conductive plate 207, combined with the annular magnet 4, is that it allows for conductive connections at any angle in the circumferential direction, facilitating reinstallation without directional alignment. As shown in FIG. 10, as long as the spacing of the annular copper foils and the conductive pins 207 are consistent, the negative conductive pins 1051 and positive conductive pins 1052 can accurately correspond and electrically connect with the negative contact copper foil 2071 and positive contact copper foil 2072 at any horizontal angle.

Refer to FIG. 8. The upper surface of the lamp board 206 is equipped with a control circuit module for controlling the LED light source 208 and charging the rechargeable battery 3, which is located above the lamp board 206. The control circuit module is based on existing technology widely used in LED desk lamps and other products, and its detailed description is omitted here.

Refer to FIGS. 2 and 7. For convenience, a handle 205 is provided at the top edge of the installation shell 203. The handle 205 is rotatably connected to the installation shell 203. A groove 202 is provided at the edge of the installation shell 203 to accommodate the handle 205. When the lamp body 2 is detached, the handle 205 can be used to hang the lamp body 2 on any hook for convenience. Additionally, the lamp body 2 can be attached to magnetic surfaces such as refrigerator doors or iron doors using the magnet 4.

In addition, a button switch 2032 is installed at the edge of the installation shell 203. The button switch 2032 is electrically connected to the lamp board 206, enabling manual control of the on/off state of the LED light source 208.

During use, the spherical lamp is first connected to the mains electricity socket. During normal nighttime use, the mains electricity supplies power to the lamp, while simultaneously charging the rechargeable battery 3, ensuring that the rechargeable battery 3 remains adequately charged. In the event of a power outage, the rechargeable battery 3 provides emergency power for continued illumination.

For portable lighting, the lamp body 2 can be detached from the lamp. The lamp body 2 can then be used as a flashlight and can also be placed in a fixed position using the magnetic attraction and handle 205 to provide illumination.

After use, the lamp body 2 can be reattached below the lamp head 1 to continue utilizing mains electricity for lighting and charging.

Figure 11:
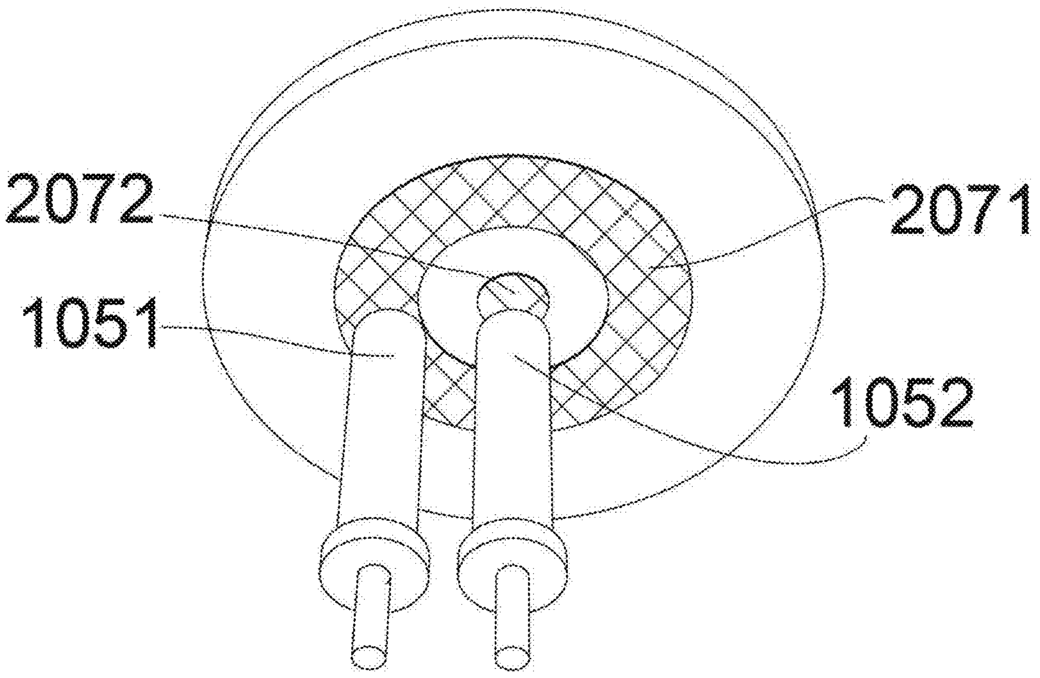
FIG. 11 is a schematic diagram showing the connection between the conductive pins and the connection plate of embodiment 2.

Embodiment 2: Refer to FIG. 11. Based on Embodiment 1, two elastic conductive pins 105 are set. The center of the corresponding conductive plate 207 features a dot-shaped positive contact copper foil 2072, which contacts the positive conductive pin 1052. The surrounding area features an annular negative contact copper foil 2071, which contacts the negative conductive pin 1051, thus achieving electrical connection.

Figure 12:
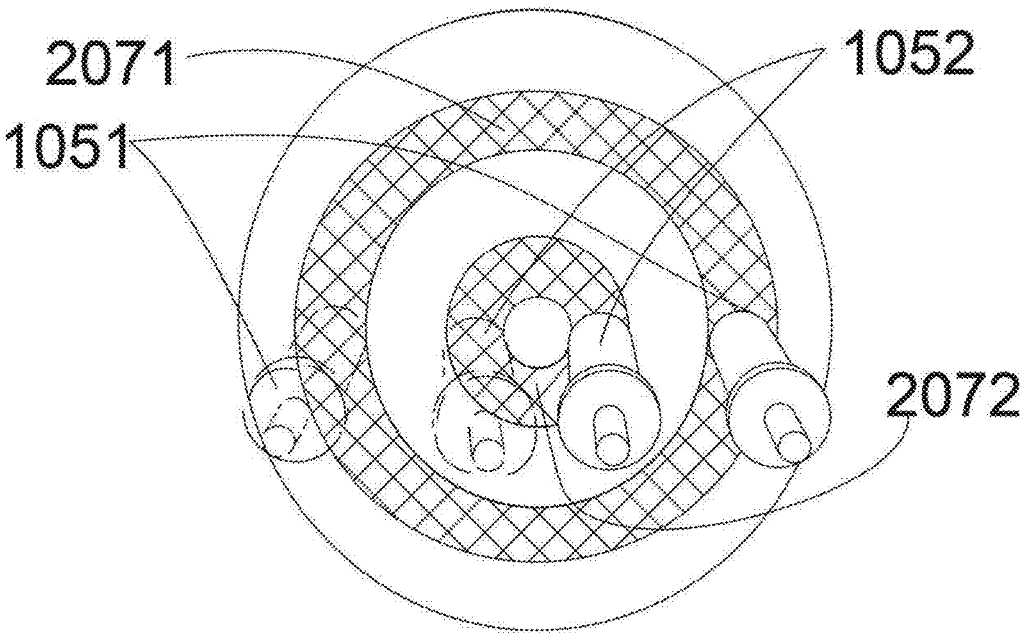
FIG. 12 is a schematic diagram showing the connection between the conductive pins and the connection plate of embodiment 3.

Embodiment 3: Refer to FIG. 12. Based on Embodiment 1, two elastic conductive pins 105 are set. The conductive copper foils of the corresponding conductive plate 207 are two concentric annular copper foils. The inner ring is the positive contact copper foil 2072, which contacts the positive conductive pin 1052. The outer annular copper foil is the negative contact copper foil 2071, which contacts the negative conductive pin 1051, thus achieving electrical connection.

Figure 13:
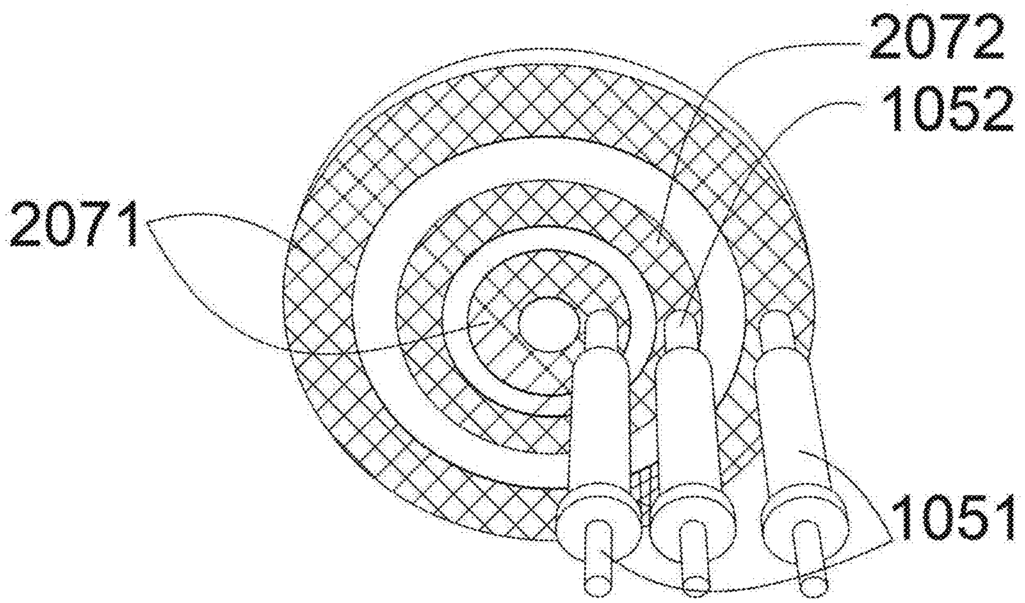
FIG. 13 is a schematic diagram showing the connection between the conductive pins and the connection plate of embodiment 4.

Embodiment 4: Refer to FIG. 13. Based on Embodiment 1, three elastic conductive pins 105 are set. The conductive copper foils of the corresponding conductive plate 207 are three concentric annular copper foils. The inner ring is the negative contact copper foil 2071, which contacts the inner negative conductive pin 1051. The middle ring is the positive contact copper foil 2072, which contacts the middle positive conductive pin 1052. The outer annular copper foil is the negative contact copper foil 2071, which contacts the outer negative conductive pin 1052, thus achieving electrical connection.

From the above design solutions, it is evident that connecting the lamp body 2 and the lamp head 1 at any angle can accurately achieve electrical connection (refer to FIGS. 10 and 12), accurately inputting the electrical energy from the lamp head 1 into the lamp body 2.

The above content provides a further detailed description of the utility model in conjunction with specific preferred embodiments. It should not be construed that the specific implementation of the utility model is limited to these descriptions. For those skilled in the art, various simple derivations or replacements can be made without departing from the concept of the utility model, all of which should be regarded as within the protection scope of the utility model.

What is claimed is:

1. A lamp, comprising:

a lamp head having a power conversion board for receiving mains electricity and outputting low voltage electricity; and a lamp body detachably connected to the lamp head, the lamp body having a battery, and LED light source, and a conductive plate receiving the low voltage electricity from the power conversion board, wherein the power conversion board includes at least two elastic conductive pins, and the conductive plate includes at least two concentric copper foils arranged to correspond to the at least two electric conductive pins, such that the conductive pins electrically connect to the copper foils to charge the battery and power the LED light when the lamp body is attached to the lamp head, while the battery provides continuous power to the LED light source when the lamp head and lamp body are detached;

wherein the lamp body further comprises a spherical lamp shell; and an installation shell fixedly connected to the spherical lamp shell, the installation shell defining a recessed cavity with an open lower end and an installation surface at an upper end, and conductive through-holes formed at a center of the installation surface, wherein the conductive plate is fixedly installed at a center of an upper side of the installation surface, and the copper foils are exposed through the conductive through-holes.

2. The lamp according to claim 1, further comprising a plurality of conductive through-holes provided at a top of the lamp body, through which the copper foils are exposed to contact between the elastic conductive pins.

3. The lamp according to claim 2, wherein the elastic conductive pins include one positive conductive pin and one negative conductive pin arranged side by side with the positive conductive pin, one of the copper foils is a center dot that contacts the positive conductive pin, the other of the copper foils is an annular copper foil that contacts the negative conductive pin.

4. The lamp according to claim 2, wherein the elastic conductive pins includes two outer negative conductive pins arranged side by side and one positive conductive pin disposed between the negative conductive pins, one of the copper foils is a center dot that contacts the positive conductive pin, the other of the copper foils is an annular copper foil that contacts the negative conductive pins.

5. The lamp according to claim 2, wherein the elastic conductive pins includes one positive conductive in pin and one negative conductive pin arranged side by side with the positive conductive pin, the copper foil consists of one inner ring contacting the positive conductive pin and an outer ring contacting the negative conductive pin.

6. The lamp according to claim 2, wherein the elastic conductive pins includes two outer negative conductive pins arranged side by side and one positive conductive pin disposed between the negative conductive pins, the copper foils consist of one inner ring contacting the positive conductive pin and an outer ring contacting the negative conductive pin.

7. The lamp according to claim 2, the lamp head further comprising a conductive threaded head; a conically-shaped upper shell coupled to the threaded head and having an open lower end defining a cavity where the power conversion board is placed; and a bottom shell covering the power conversion board.

8. The lamp according to claim 7, further comprising at least two guide holes formed in the middle of the bottom shell to correspond to the positions of the conductive pins, such that the conductive pins pass through the guide holes and are exposed through a lower surface of the bottom shell.

9. The lamp according to claim 7, further comprising a recessed annular groove on an upper surface of the bottom shell, and an annular iron sheet provided inside the groove.

10. The lamp according to claim 1, further comprising a recessed annular groove formed on an outer side of the installation surface; an annular magnet disposed inside the groove; support columns connected to the installation shell; and a lamp board fixed to the support columns with screws, wherein the LED light source disposed on a lower surface of the lamp board, and wires connect the lamp board to the battery.

11. The lamp according to claim 10, further comprising a control circuit for controlling the LED light source and charging the battery, the control circuitry provided on an upper surface of the lamp board.

12. The lamp according to claim 11, further comprising a handle rotatably connected to a top edge of the installation shell; and a groove formed on an edge of the installation shell and configured for accommodating the handle.

13. The lamp according to claim 11, further comprising a button switch provided on an edge of the installation shell, the button switch electrically connected to the lamp board for controlling operation of the LED light source.

* * * * *